(12) United States Patent
Mejia

(10) Patent No.: US 11,303,144 B1
(45) Date of Patent: Apr. 12, 2022

(54) CHARGING DEVICE FOR CELLULAR PHONE

(71) Applicant: Eliezzer A. Mejia, Brentwood, NY (US)

(72) Inventor: Eliezzer A. Mejia, Brentwood, NY (US)

(*) Notice: Subject to any disclaimer, the term of this patent is extended or adjusted under 35 U.S.C. 154(b) by 12 days.

(21) Appl. No.: 16/930,835

(22) Filed: Jul. 16, 2020

(51) Int. Cl.
*H01M 10/46* (2006.01)
*H02J 7/00* (2006.01)
*H02J 7/02* (2016.01)

(52) U.S. Cl.
CPC .......... *H02J 7/0047* (2013.01); *H02J 7/0042* (2013.01); *H02J 7/02* (2013.01); *H02J 2207/30* (2020.01); *H02J 2310/22* (2020.01)

(58) Field of Classification Search
CPC .......... H02J 7/0047; H02J 7/0042; H02J 7/02; H02J 7/0044; H02J 50/005; H02J 50/10
USPC .................. 320/107, 108, 111, 114, 115
See application file for complete search history.

(56) References Cited

U.S. PATENT DOCUMENTS

| 8,541,985 | B1* | 9/2013 | Wong | H02J 7/342 |
| | | | | 320/140 |
| D697,867 | S | 1/2014 | Weinstein et al. | |
| 8,629,651 | B2 | 1/2014 | Guccione et al. | |
| D702,632 | S | 4/2014 | Salmon | |
| 9,318,915 | B2 | 4/2016 | Miller et al. | |
| 9,419,465 | B2 | 8/2016 | van Lammeren et al. | |
| 9,506,446 | B2 | 11/2016 | Xinfang | |
| 9,847,659 | B2 | 12/2017 | Olah et al. | |
| 2005/0130712 | A1* | 6/2005 | Saghbini | H02J 7/0013 |
| | | | | 455/572 |
| 2009/0115367 | A1 | 5/2009 | Kidakam | |
| 2013/0076298 | A1 | 3/2013 | Miller et al. | |
| 2013/0193911 | A1 | 8/2013 | Miller et al. | |
| 2017/0025886 | A1 | 1/2017 | Rohmer et al. | |
| 2020/0144835 | A1* | 5/2020 | Liu | A45C 15/00 |
| 2020/0191345 | A1* | 6/2020 | Chien | F21V 21/22 |

FOREIGN PATENT DOCUMENTS

| CN | 111845392 A | * | 10/2020 | | H02J 7/0045 |
| KR | 20210038231 A | * | 4/2021 | | H02J 50/10 |

OTHER PUBLICATIONS

Jolt Power Bank. Product Listing [online], © 2020 CustominK, LLC. [retrieved on Mar. 5, 2020]. Retrieved from the Internet: <URL: https://www.customink.com/products/styles/jolt-power-bank/261000?PK=261000"e_qty=100&samples=true"e_fc=1&noindex=1&pc=PLA-154982&mrkgadid=3325931620&mrkgc=293&mrkgen=gpla&mrkgbflag=0&mrkgcat=pla&acctid=21700000001566238&dskeywordid=92700040401538558&dsproductgroupid=665261925967&product_id=261000%7CBlack%7COne+Size%>.

(Continued)

*Primary Examiner* — Edward Tso
(74) *Attorney, Agent, or Firm* — Cramer Patent & Design, PLLC; Aaron R. Cramer

(57) ABSTRACT

A charging device provides the ability to fast charge various personal electronic devices in a wireless manner without being tethered by a cable. The charging device includes a first housing with an input charging port and an output charging port. A charging adapter is fashioned as a second housing with an AC power adapter and a plurality of charging jacks, each capable of receiving the input charging port of the first housing.

18 Claims, 5 Drawing Sheets

(56) References Cited

OTHER PUBLICATIONS

Anker PowerCore 10000 PD Redux, 10000mAh Portable Charger USB-C Power Delivery (18W) Power Bank for Phone 11/11 Pro /11 Pro Max / 8 / X/XS Samsung S10, Pixel 3/3XL, iPad Pro 2018, and More. Product Listing [online], © 1996-2020, Amazon.com, Inc. [retrieved on Mar. 5, 2020]. Retrieved from the Internet: <URL: https://www.amazon.com/Anker-PowerCore-10000mAh-Portable-Delivery/dp/B07PXMF52C/ref-zg_bs_7073960011_17?_encoding=UTF8&psc=1&refRID=01QC0XMPXBYR05SYTV58>.

Portable Power Bank Charger—4 Mini Magnetic Charging Packs with Charging Station Stand-Alone Powerbank for Phone Android. Product Listing [online]. © Trending+Viral Now [retrieved on Mar. 25, 2019]. Retrieved from the Internet <URL: https://trendingviralnow.com/products/fingerpow-portable-power-bank-charger-1-charging-station-4-mini-magnetic-charging-packs-universal-mobile-phone-charger-for-iphone-samsung-xiaomi?_pos=5&_sid=584739e67&_ss=r.

\* cited by examiner

CHARGING DEVICE FOR CELLULAR PHONE

RELATED APPLICATIONS

None.

FIELD OF THE INVENTION

The presently disclosed subject matter is directed to a charging device and more specifically to a charging device for electronic devices.

BACKGROUND OF THE INVENTION

Cellular telephone technology is quite possibly the most convenient piece of modern-day technology developed in recent times. The use of cellular phone technology has revolutionized the communication industry as a large percentage of Americans take advantage of their convenience. This fact is exemplified in the phenomena that more and more cities are forced to split telephone area codes in order to accommodate the ever-increasing volume of telephone numbers.

However, like most other conveniences, the use of a cellular telephone does have its drawbacks, the largest of which has to do with the constant hassle of recharging the battery that power the phone. The user is constantly required to re-charge the batteries using a wall or automobile adaptor that is often bulky, ties them to cable and charging source, and prevents the user from using the phone in a mobile fashion while the recharging takes place. Accordingly, the need has developed to improve upon the means by which cell phones, as well as other portable electronic devices can be re-charged. The development of the charging device for electronic devices fulfills this need.

SUMMARY OF THE INVENTION

The principles of the present invention provide for a charging device comprises a first housing which has a first end and a second end. The first end is provided with an input charging port and the second end is provided with an output charging port. The first housing is provided with a first status LED to indicate state of charge. The output charging port is inserted into a receiving power jack of an electronic device along an insertion travel path. The charging device also comprises a charging adapter which has a second housing with an AC input connector and a plurality of charging jacks. The second housing includes the charging jacks that accept the input charging port and each of the charging jacks are provided with a second status LED. The charging device also comprises a pair of receiving slots which allow the AC input connector to fold along a ninety-degree travel path such that the second housing is reduced to facilitate storage and travel.

The first status LED may glow a red color to indicate that the charging device requires charging. The first status LED may glow a green color to indicate that the charging device is satisfactorily charged. The first housing may be made of plastic and may be in the range of 1-½ in. long by ½ in. wide by ½ in. thick. The second status LED may glow a red color to indicate that the charging device requires charging. The second status LED may glow a green color to indicate that the charging device is satisfactorily charged. The charging jacks may operate in an independent manner allowing use of the charging device in any of the charging jacks. The charging adapter may charge up to three of the charging devices simultaneously. The input charging port may be circular while the charging jack may also be circular.

The circular charging jack and the input charging port may allow for easy insertion of the charging device without regard to a specific orientation. The output charging port may be in a format selected by the group consisting of a USB-mini format, a USB-micro format, a USB-C format, or an Apple Lightning format. The electronic device may be selected from the group consisting of a cellular telephone, a tablet computer, a set of earphones, a camera, a radio, a flashlight, or a dog training collars. The charging adapter may be a Type A (NEMA 1-15) plug for use on a 120-volt AC electrical system. The second housing may be made of plastic. The charging adapter may be 2 in. long, 1-½ in. tall, and 1 in. wide. The charging device may provide electrical power to the electronic device to allow for fast charging of an internal battery of the electronic device to allow for continuous use. The charging device may be utilized with the electronic device without a charging cable and may be therefore less cumbersome because of the relatively small and wireless nature of the charging device.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
FIG. 1 is a perspective view of the charging device for an electronic device, according to the preferred embodiment of the present invention.
Figure 1:
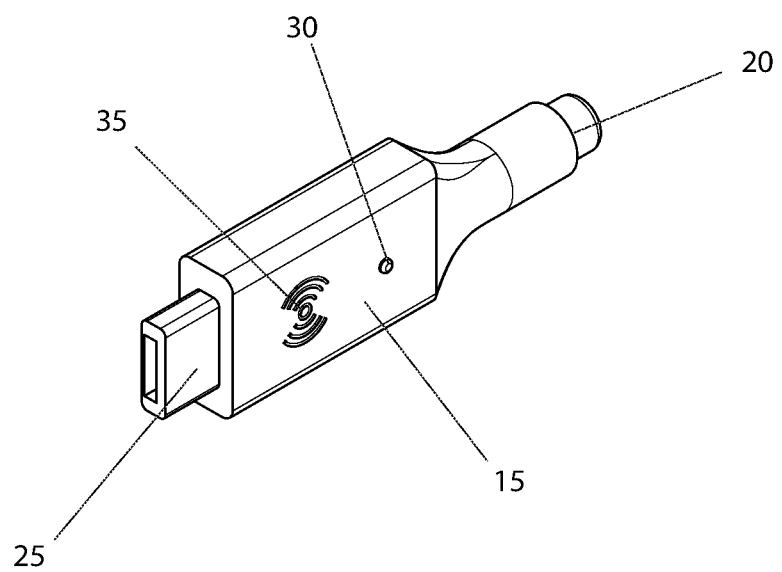

DESCRIPTIVE KEY 10 charging device
15 first housing
20 input charging port
25 output charging port
30 first status LED
35 finger grip area
40 charging adapter
45 second housing
50 AC input connector
55 receiving slot
60 travel path "a"
65 charging jack
70 second status LED
75 first insertion travel path "1"
80 insertion path "c"
85 electronic device 90 receiving power jack
95 second insertion travel path "2"
100 transformer
105 rectifier
110 first battery
115 first filter capacitor
120 voltage regulator
125 second filter capacitor
130 first dropping resistor
135 powerboost charger
140 second battery
145 second dropping resistor

DESCRIPTION OF THE PREFERRED EMBODIMENTS

The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Referring now to FIG. 1, a perspective view of the charging device 10 for an electronic device 85, according to the preferred embodiment of the present invention is disclosed. The charging device (herein also described as the "device") 10, provides the ability to fast charge various electronics such as cellular phones in a wireless manner without being tethered by a cable. The device 10 includes a first housing 15 envisioned to be made of plastic with the approximate dimensions of one-and-one-half inches (1-1½ in.) long by one-half inch (½ in.) wide by one-quarter inch (¼ in.) thick. A first end of the first housing 15 is provided with an input charging port 20 while an opposite second end is provided with an output charging port 25. The output charging port 25 would be made available in a wide variety of formats such as USB-mini, USB-micro (as shown), USB-C, Apple Lightning®, or the like. Future charging port conventions, not yet known or recognized, could also be incorporated into the output charging port 25. As such, the exact type of charging plug used for the output charging port 25 should not interpreted as a limiting factor of the present invention.

The input charging port 20 is circular in nature and would be common to all devices 10, regardless of the type of output charging port 25 utilized. The first housing 15 is provided with a first status LED 30 to indicate state of charge. The first status LED 30 would glow a first color, such as red, to indicate that the device 10 requires charging, and would glow a second color, such as green, to indicate that the device 10 is satisfactorily charged. A finger grip area 35 provides additional friction when inserting or removing the device 10 from various devices as will be described herein below.

Figure 2:
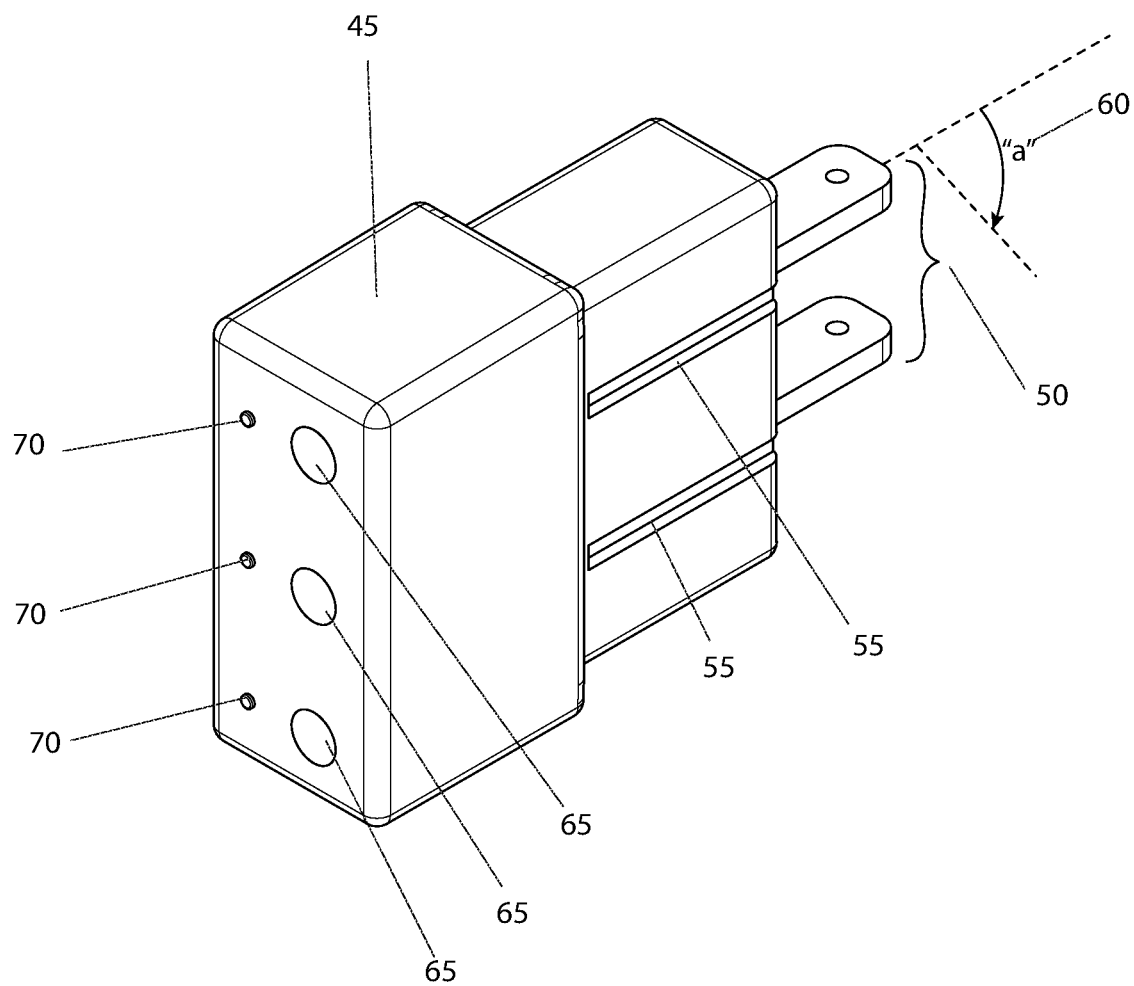
FIG. 2 is a perspective view of the charging adapter, as used with the charging device for an electronic device, according to the, according to the preferred embodiment of the present invention.

Referring next to FIG. 2, a perspective view of the charging adapter 40, as used with the device 10, according to the, according to the preferred embodiment of the present invention is depicted. The charging adapter 40 is provided with second housing 45, envisioned to be made of plastic, with the overall approximate dimensions of two inches (2 in.) long, one-and-one-half inches (1-½ in.) tall, and one inch (1 in.) wide. One (1) of the second housings 45 is provided with an AC input connector 50 herein depicted as a Type A (NEMA 1-15) plug for use on 120-volt AC electrical systems. It is noted however that other styles of plugs that operate on different voltage levels could also be utilized with the present invention and as such, should not be interpreted as a limiting factor of the present invention. A set of receiving slots 55 are provided to allow the AC input connector 50 to fold along a ninety-degree (90°) travel path "a" 60 such that the overall length of the second housing 45 can be reduced to facilitate storage and travel. The opposite end of the second housing 45 is provided with at least three (3) charging jacks 65, circular in nature, that accept the input charging port 20 (as shown in FIG. 1). Each charging jack 65 is provided with a second status LED 70. Similar in function to the first status LED 30, the second status LED 70 would glow a first color, such as red, to indicate that the device 10 (as shown in FIG. 1) requires charging, and would glow a second color, such as green, to indicate that the device 10 is satisfactorily charged.

Figure 3:
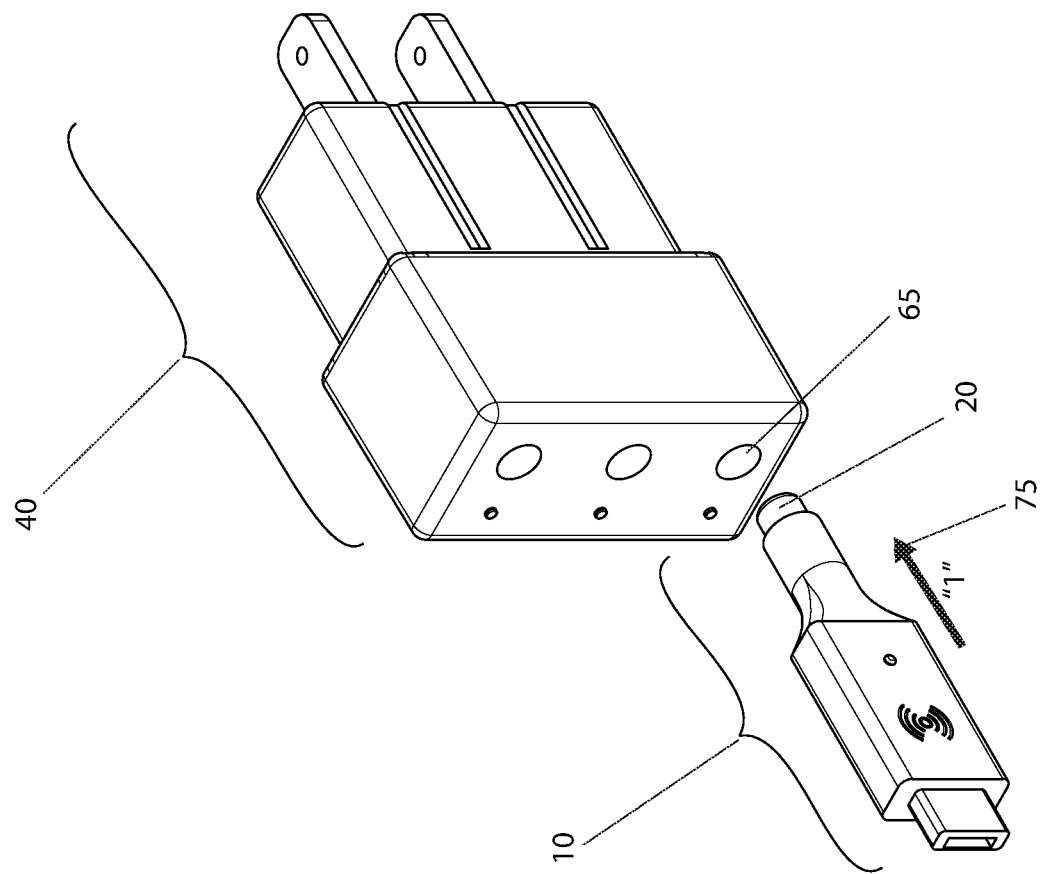
FIG. 3 is a perspective view of the charging device for an electronic device shown in a utilized state with the charging adapter, according to the preferred embodiment of the present invention.

Referring now to FIG. 3, a perspective view of the device 10 shown in a utilized state with the charging adapter 40, according to the preferred embodiment of the present invention is shown. The device 10 is depicted in the state of being inserted into one (1) of the three (3) charging jacks 65 in the charging adapter 40 along a first insertion travel path "1" 75. It is noted that all of the charging jacks 65 operate in an independent manner, thus allowing use of the device 10 in any of the three (3) charging jacks 65. The charging adapter 40 is thus capable of charging up to three (3) devices 10 simultaneously. The device 10 may be inserted along a 360-degree (360°) insertion path "c" 80. This capability, due to the circular nature of the charging jacks 65 and the input charging port 20, allows for easy insertion of the device 10 without regard to a specific orientation.

Figure 4:
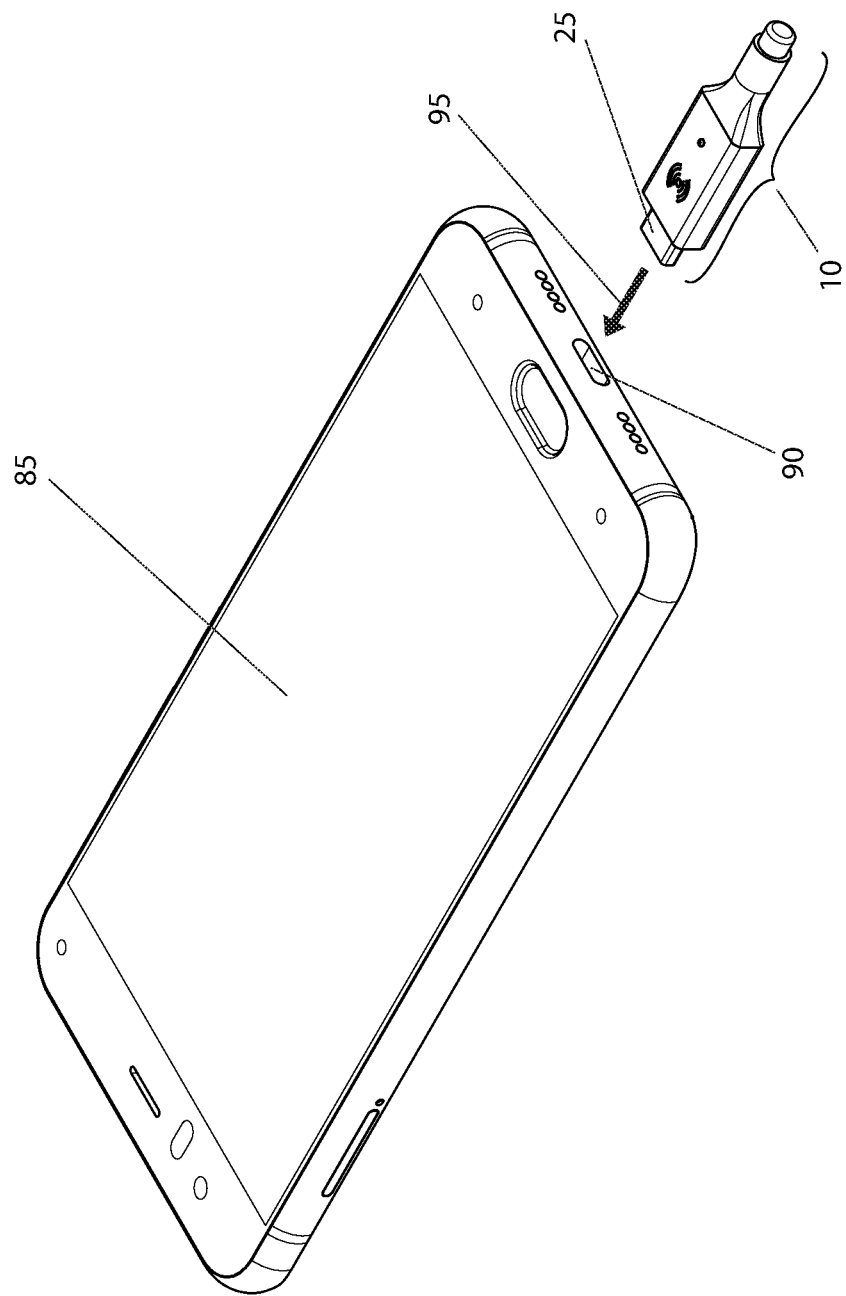
FIG. 4 is a perspective view of the charging device for an electronic device, shown in a utilized state with an electronic device, according to the preferred embodiment of the present invention; and, FIG. 5 is an electrical schematic diagram of the charging device for an electronic device, according to the preferred embodiment of the present invention.

Referring next to FIG. 4, a perspective view of the device 10, shown in a utilized state with an electronic device 85, according to the preferred embodiment of the present invention is disclosed. The electronic device 85 is depicted as a cellular telephone for purposes of illustration. However, other types of electronic devices 85 including, but not limited to: tablet computers, earphones, cameras, radios, flashlights, dog training collars, or the like could be utilized as well. As such, the use of the device 10 with any particular type of electronic device 85 should not be interpreted as a limiting factor of the present invention. The output charging port 25 of the device 10 is inserted into a receiving power jack 90 of the electronic device 85 along a second insertion travel path "2" 95. The type of output charging port 25 selected must be the style (USB-mini, USB-micro (as shown), USB-C, Apple Lightning®, or the like.) as that of the receiving power jack 90. With the device 10 properly inserted, electrical power is provided to the electronic device 85 to allow for fast charging of the internal battery of the electronic device 85 to allow for continuous use. Due to the relatively small and wireless nature of the device 10, it can be utilized with the electronic device 85 while mobile and without the cumbersome nature of a charging cable as current methods require.

Figure 5:
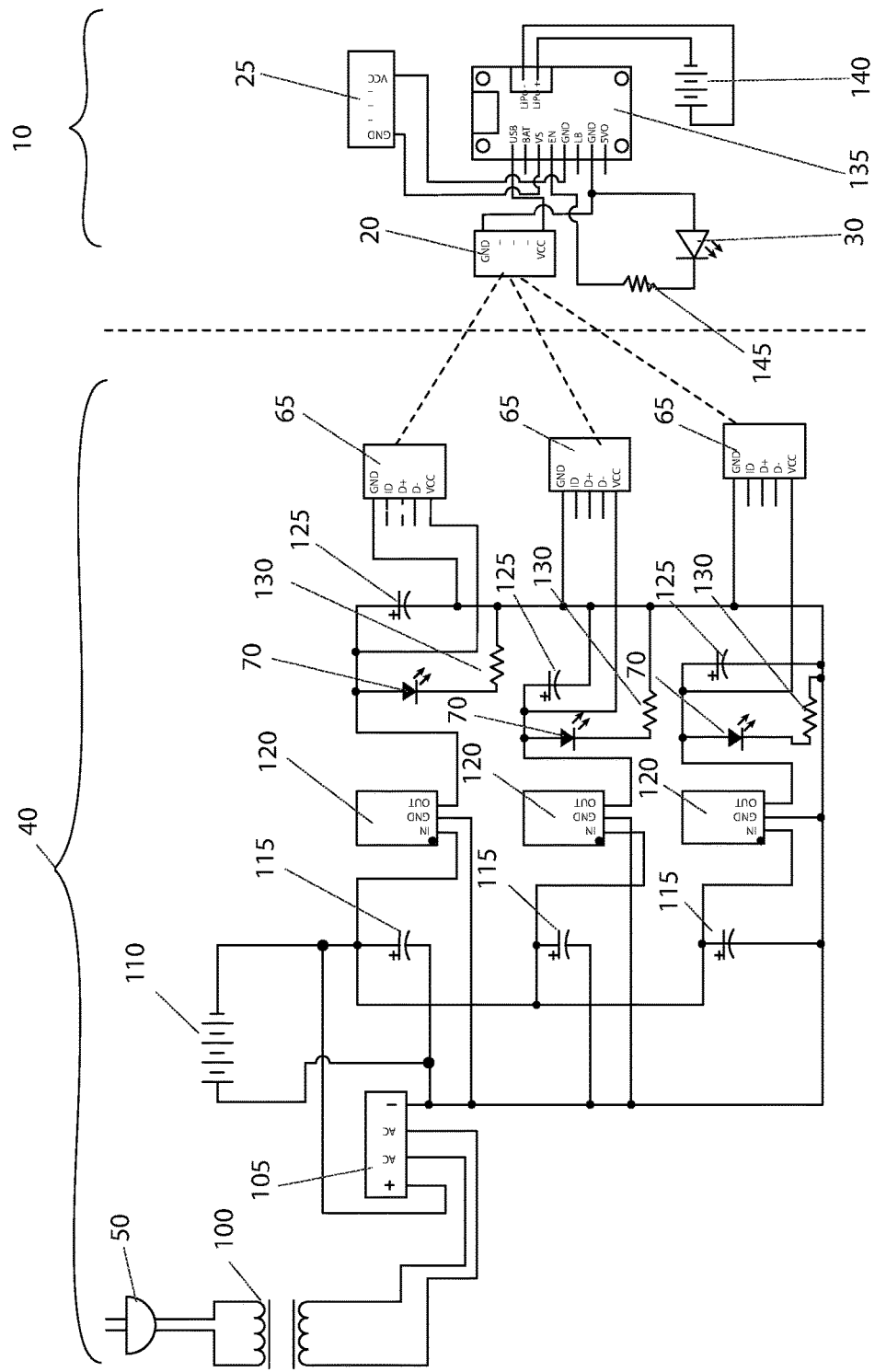

Referring to FIG. 5, an electrical schematic diagram of the device 10, according to the preferred embodiment of the present invention is depicted. AC power is delivered into the AC input connector 50 where it is stepped down by a transformer 100. The output of the transformer 100 is connected to a rectifier 105 to convert the AC voltage to a DC voltage. A first battery 110 is connected in a parallel manner to the output of the rectifier 105. The first battery 110 is thus charged when the charging adapter 40 is connected to an AC outlet. Should an AC outlet not be available, the first battery 110 will operated the charging adapter 40 and allow for charging of the multiple device 10 even though not powered by the AC input connector 50. The output of the rectifier 105 and the first battery 110 is then distributed to three (3) identical circuits. Each circuit consists of a first filter capacitor 115 to remove any AC ripple that may be present. The resultant voltage is then passed to a voltage regulator 120 which limits the voltage made available to the remained of the circuitry. The output of the voltage regulator 120 then passes through a second filter capacitor 125 where it is connected to the charging jacks 65. The second status LED 70 works with a first dropping resistor 130 to provide the aforementioned described voltage information.

The balance of the schematic diagram of FIG. 5 depicts the device 10. It is noted that only one (1) device 10 is shown for purposes of simplicity, however, up to three (3) different devices 10 can be used with the charging adapter 40 at once. The input charging port 20 provides power to a powerboost charger 135 envisioned to be an Adafruit® PowerBoost 1000 Charger Rechargeable 5V Lipo USB Boost or similar. A second battery 140, envisioned to be of the lithium-ion variety stores energy from the powerboost charger 135 and allows for portable wireless operation of the device 10. Output power is delivered to the output charging port 25. The first status LED 30 through a second dropping resistor 145, provides indication of charging state of the second battery 140 as aforementioned described.

2. Operation of the Preferred Embodiment

The preferred embodiment of the present invention can be utilized by the common user in a simple and effortless manner with little or no training. It is envisioned that the device 10 would be constructed in general accordance with FIG. 1 through FIG. 5. The user would procure the device 10 from conventional procurement channels such as discount stores, department stores, electronic retailers, mail order and internet supply houses and the like. Special attention would be paid to the exact type of output charging port 25 style (USB-mini, USB-micro (as shown), USB-C, Apple Lightning®, or the like.) needed for the specific intended use.

After procurement and prior to utilization, the device 10 would be prepared in the following manner: the input charging port 20 of the device 10 would be connected to the charging jack 65 of the charging adapter 40 as shown in FIG. 2; the AC input connector 50 would be connected to an AC outlet of the proper voltage if the first battery 110 is not sufficiently charged; once the second status LED 70 indicates that the second battery 140 of the device 10 is sufficiently charged, the input charging port 20 may be removed from the charging jack 65; and the device 10 is ready for use.

During utilization of the device 10, the following procedure would be initiated: should an electronic device 85 require recharging, the output charging port 25 of the device 10 is connected to the receiving power jack 90; a fast charge is then delivered to the electronic device 85 that allows for continuous mobile use of the electronic device 85 without being tethered to a recharging source via a cable; while the electronic device 85, now replenished, can be operated in a conventional manner.

After use of the device 10, it may be removed from the electronic device 85 and returned to a charging jack 65 on the charging adapter 40 to be recharged to allow for continuous use in a repetitive manner.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A charging device, comprising:
a first housing having a first end and a second end, the first end is provided with an input charging port and the second end is provided with an output charging port, the first housing is provided with a first status LED to indicate state of charge, the output charging port is inserted into a receiving power jack of an electronic device along an insertion travel path;
a charging adapter having a second housing with an AC input connector and a plurality of charging jacks, the second housing includes the charging jacks that accept the input charging port and each of the charging jacks are provided with a second status LED; and
a pair of receiving slots allowing the AC input connector to fold along a ninety-degree travel path such that the second housing is reduced to facilitate storage and travel.

2. The charging device according to claim 1, wherein the first status LED glows a red color to indicate that the charging device requires charging.

3. The charging device according to claim 1, wherein the first status LED glows a green color to indicate that the charging device is charged.

4. The charging device according to claim 1, wherein the first housing is made of plastic.

5. The charging device according to claim 1, wherein the first housing is in the range of 1-1½ in. long by ½ in. wide by ¼ in. thick.

6. The charging device according to claim 1, wherein the second status LED glows a red color to indicate that the charging device requires charging.

7. The charging device according to claim 1, wherein the second status LED glows a green color to indicate that the charging device is satisfactorily charged.

8. The charging device according to claim 1, wherein the charging jacks operate in an independent manner allowing use of the charging device in any of the charging jacks.

9. The charging device according to claim 1, wherein the charging adapter charges up to 3 of the charging devices simultaneously.

10. The charging device according to claim 1, wherein the input charging port is circular.

11. The charging device according to claim 1, wherein the charging jack is circular.

12. The charging device according to claim 1, wherein the circular charging jack and the input charging port allows for easy insertion of the charging device without regard to a specific orientation.

13. The charging device according to claim 1, wherein the output charging port is in a format selected by the group consisting of a USB-mini format, a USB-micro format, or a USB-C format.

14. The charging device according to claim 1, wherein the electronic device is selected from the group consisting of a cellular telephone, a tablet computer, a set of earphones, a camera, a radio, a flashlight, or a dog training collars.

15. The charging device according to claim 1, wherein the charging adapter is a Type A (NEMA 1-15) plug for use on a 120-volt AC electrical system.

16. The charging device according to claim 1, wherein the second housing is made of plastic.

17. The charging device according to claim 1, wherein the charging adapter is 2 in. long, 1-½ in. tall, and 1 in. wide.

18. The charging device according to claim 1, wherein the charging device provides electrical power to the electronic device to allow for fast charging of an internal battery of the electronic device to allow for continuous use.

\* \* \* \* \*